Aug. 28, 1962  F. B. STANNARD  3,051,605
METHOD OF MAKING VALVED BAGS FROM EXTRUDED
THERMOPLASTIC MATERIALS
Filed Nov. 20, 1958  3 Sheets-Sheet 1
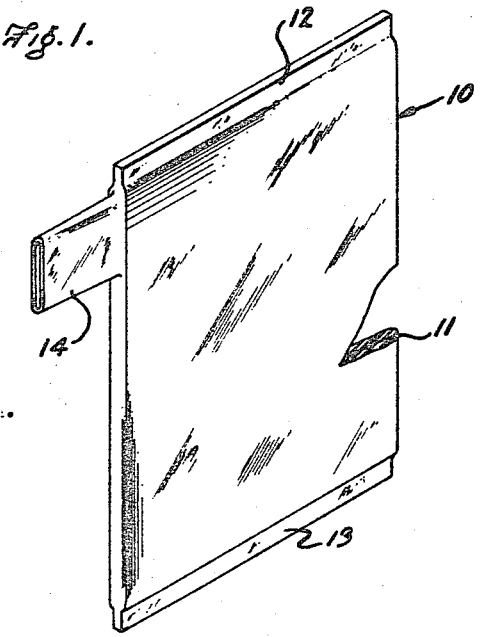
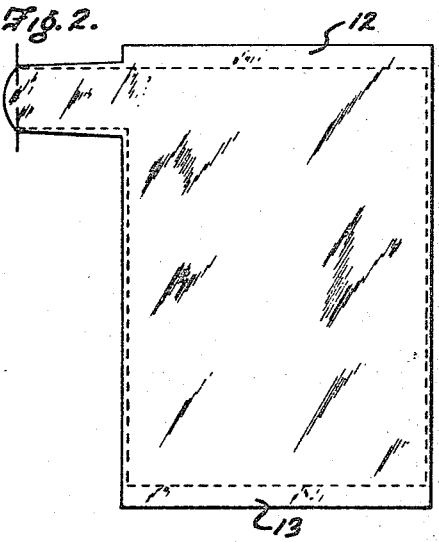
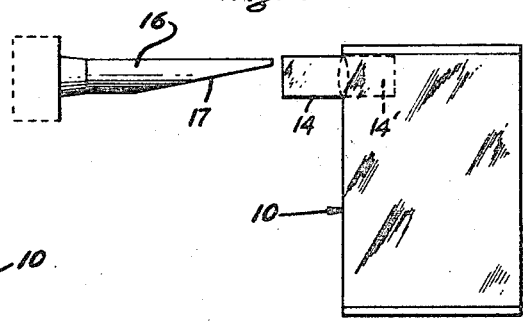
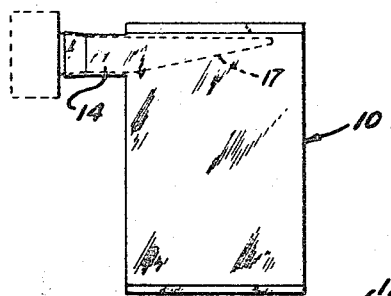
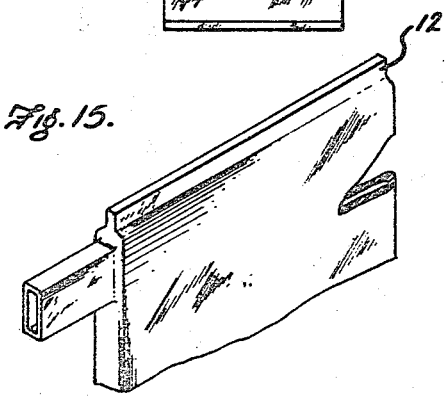
INVENTOR
FORREST B. STANNARD
BY Chapin & Neal
ATTORNEYS

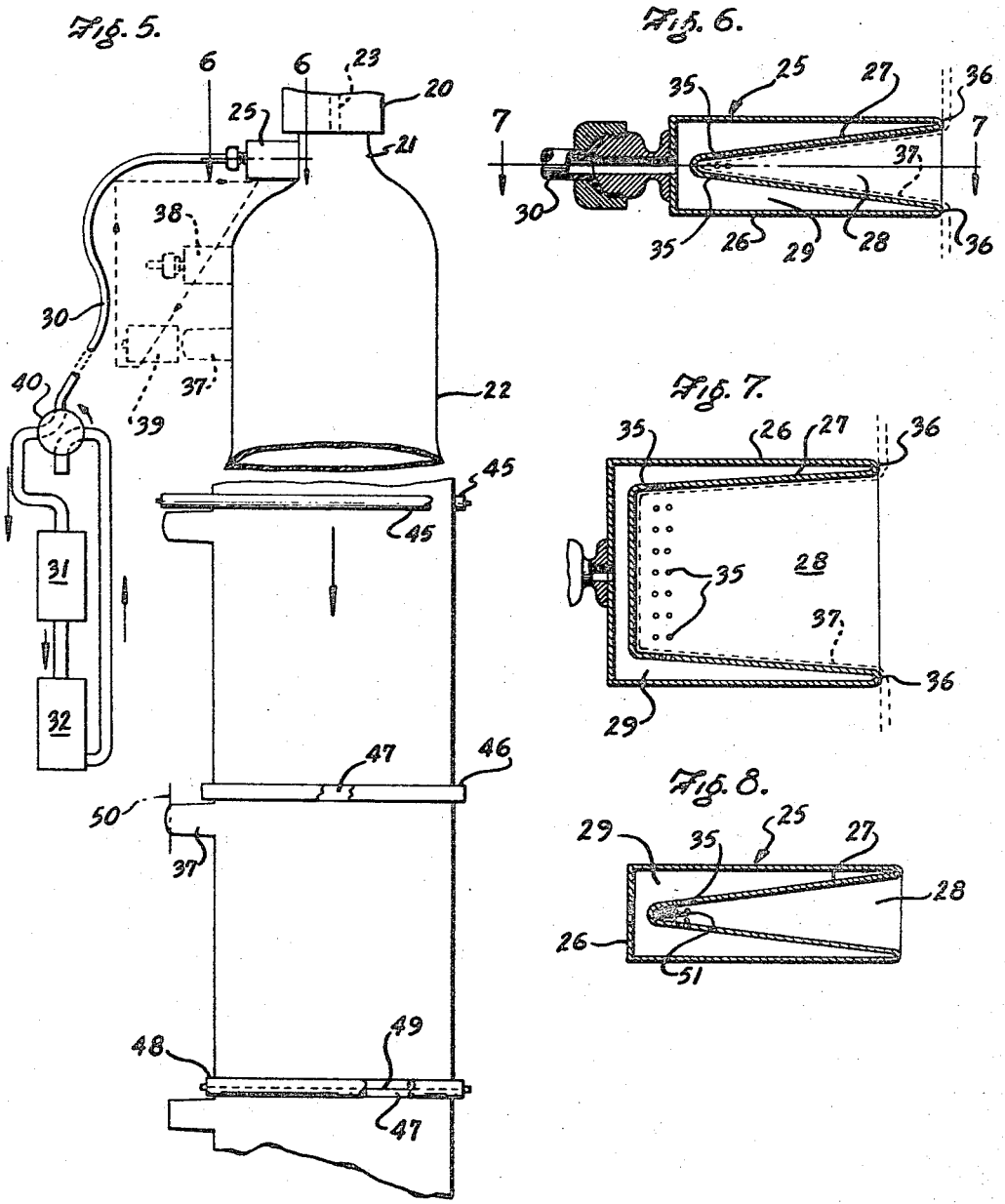

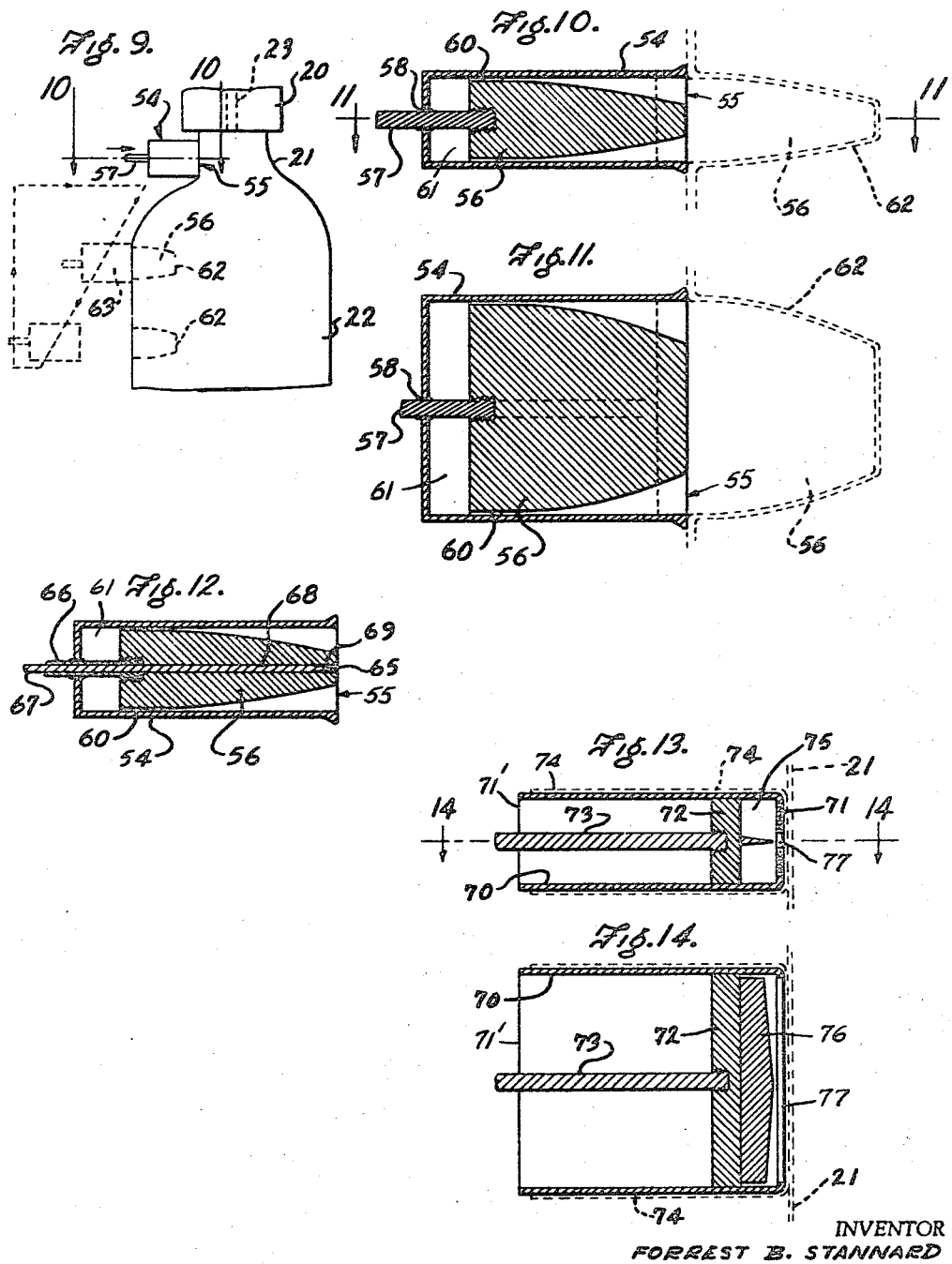

United States Patent Office
3,051,605
Patented Aug. 28, 1962

3,051,605
METHOD OF MAKING VALVED BAGS FROM EXTRUDED THERMOPLASTIC MATERIALS
Forrest B. Stannard, N. High St., Clinton, Conn.
Filed Nov. 20, 1958, Ser. No. 775,304
12 Claims. (Cl. 156—196)

This invention relates to a bag of the type which is permanently closed at both ends and provided with a tubular member of relatively small diameter opening from the interior and extending outwardly from the body of the bag through which the bag may be filled. The tube is thereafter forced inwardly where it will be collapsed and held closed by the weight of the material in the bag.

Bags of this general type have been limited to fabricated structures usually of paper, cloth and similar materials. Such bags have had a limited field of use because of fabricating costs, and the lack of strength, moisture resistance and chemical inertness. It has long been known in the packing industry that many synthetic plastics, polyethylene for example, in the form of films and sheetings have these desirable physical properties, lacking in other wrapping and packaging materials, and while it has been proposed to make so-called valved bags from polyethylene and other plastics the constructions proposed and the fabrication involved has not acceptably met the packaging procedures and manufacturing costs requisite for commercial use.

It is the principal object of the invention to provide a valved bag structure which can be made of plastic films or sheeting such as polyethylene, as a continuous economically mass-produced item and one which permits the use of conventional filling apparatus and procedures. A further object is to provide a construction which may be made with a minimum of seams or piecing of parts.

Other and further objects and advantages will be made apparent in the disclosures of the accompanying drawings and the following specification and claims.

In the accompanying drawings,
FIG. 1 is a generally perspective view of a bag embodying the invention;
FIG. 2 is an elevational view of the bag of FIG. 1 illustrating a step in manufacturing the bag or, alternatively a step preparatory to filling the bag;
FIGS. 3 and 4 diagrammatically illustrate one conventional bag filling procedure to which the bag of the invention is well adapted;
FIG. 5 is a diagrammatic view showing the method of manufacturing the bag of FIGS. 1 or 2;
FIG. 6 is a sectional detail view substantially on line 6—6 of FIG. 5 but on a larger scale;
FIG. 7 is a sectional view substantially on line 7—7 of FIG. 6;
FIG. 8 is a view similar to FIG. 6 but showing a modified form;
FIG. 9 diagrammatically illustrates a modification of the method of FIG. 5;
FIG. 10 is a sectional detail view substantially on line 10—10 of FIG. 9 but on a larger scale;
FIG. 11 is a sectional view substantially on line 11—11 of FIG. 10;
FIG. 12 is a view similar to FIG. 10 but showing a modified form;
FIGS. 13 and 14 are views similar to FIGS. 10 and 11 respectively, FIG. 14 being a sectional view substantially on line 14—14 of FIG. 13, but showing another modified form; and
FIG. 15 is a fragmentary generally perspective view showing a bag having a valve as formed by the method and devices of FIGS. 13 and 14.

Referring to FIG. 1 the bag, generally indicated at 10, is shown as comprising a body portion formed of a length of flattened plastic tubing 11, heat sealed across its ends as at 12 and 13 respectively, the length 11 being formed with a unitary tubular filling valve member 14 of relatively small diameter extending outwardly from one side edge portion of the length 11 adjacent the sealed end edge portion 12, and providing the sole opening to the interior of the bag. The bag is of one piece construction—seamless except for the strong relatively wide heat sealed seams 12 and 13.

As diagrammatically shown in FIGS. 3 and 4 the bag of the invention may be filled by means of the conventional filling spout 16 over which the filling valve member 14 is threaded to position the spout inwardly of the bag as indicated in FIG. 3. With the bag thus suspended from the spout 16 material is discharged through the lower open side 17 of the spout to load the bag, after which the bag is removed from the spout 16, and the tube 14 tucked inwardly as indicated in dotted lines at 14′ in FIG. 4 where it will be collapsed and held closed by the weight of the material in the bag when the latter is inverted, all in accordance with conventional packaging practice.

Preferably and advantageously the bags are formed in continuous procedure as diagrammatically illustrated in FIGS. 5, 6 and 7. As there shown, thermoplastic material in a hot plastic state is extruded through a conventional or suitable extruding die 20 in the form of a continuous tube 21 which is transversely extended to desired diameter, as indicated at 22, by air pressure supplied through an opening 23 in the inner die member. As the hot material leaves the die 20 it is in a plastic condition capable of stretching to increase the diameter of the tube as indicated, and of otherwise being shaped or formed. In accordance with the invention an open ended suction box, generally indicated at 25, is brought into engagement with the outer surface of the tube 21 as it advances from the die 20, as shown in full lines in FIG. 5.

As best shown in FIGS. 6 and 7 box 25 comprises an outer wall 26 and a reentrant inner wall 27 which forms a valve forming chamber 28. Suction is supplied to the chamber 29 between the outer and inner walls 26—27 through a flexible tube 30 from a vacuum tank 31 in which vacuum is maintained by an air pump 32.

Vacuum box 25 is advanced in contact with tube 21 in timed relation with the extrusion of the hot plastic material from the die. Polyethylene, in common with other plastics, has the capacity when in a hot plastic state of making an air-tight bond with metal, the bond releasing as the plastic cools to a form-stable condition. The inner wall 27 of the box 25 is provided with a plurality of suitably positioned openings 35. As the box 25 is brought into contact with the hot plastic the latter seals itself to the lip edges 36 of chamber 28, and application of suction to the chamber 29 is effective through openings 35 to draw the warm plastic between the lips 36 into the chamber 28, as indicated at 37, as the box 25 advances. When the box 25 reaches a position, indicated in dotted lines at 38 in FIG. 5, at which the polyethylene has cooled to a form-stable condition, the portions of tube 22 in contact with lips 36, as well as the valve forming portion 37, becomes free from the engaged metal surfaces of the box 25 and the latter is withdrawn as indicated in dotted lines at 39 in FIG. 5. Preferably as the box 25 withdraws the vacuum in chamber 29 is replaced by air pressure, through rotation of a suitable valve 40 to assure prompt and clean ejection of portion 37 from the vacuum box. Upon withdrawal of box 25 the latter is returned and again brought into engagement with the constantly issuing tube 21 to form successive spaced valve forming portions 37 on the tube 22. It will be understood that the closed path of movement of the box, as indicated at 41, will take into consideration the increasing diameter of tube portion 22 over portion 21.

As previously mentioned the initial sealing of the hot plastic to lips 36 means that the valve portion 37 is formed entirely from the area of plastic encompassed by the lips 36, resulting in a substantial thinning of the plastic film forming the portion 37 as compared with the body of the tube. However, the body of the tube is reduced from its original thickness because of its increase in diameter as it expands from its original condition at 21 to its condition at 22 under pressure introducted through the passage 23 of the die. If necessary to maintain desired film thickness the extrusion orifice of die 20 may be so formed as to supply an initially greater thickness of material to the portion of the tube 21 engaged by suction box 25.

Following withdrawal of box 25 the tube 22 passes between suitable drawing and flattening rolls 45 and to and beneath a heated sealing bar 46 or other sealing mechanism which welds the opposing portions of the flattened tube together along a transverse zone 47 adjacent the valve portions 37, after which the tube is cut into bag forming sections as by a rotary knife 48 which cuts the tube centrally of the zone 47 as indicated at 49. At any suitable point subsequent to the passage of the tube between rolls 45 the portion 37 may pass between a suitable rotary or other cutter 50 which cuts off the closed end of portion 37, thus completing the formation of valve member 14 of FIG. 1, the severed portions of welded zone 47 forming the upper and lower end closures 12 and 13 of FIG. 1.

As an alternative to the removal of the closed end of portion 37 by cutter 50, the inner end of chamber 28 of the vacuum box may be provided with a projecting knife blade 51, as shown in FIG. 8, which pierces and slits open the end of portion 37 as the latter is formed.

For some purposes it may be found desirable to leave the outer end of the valve member 37 closed as indicated in FIG. 2—to be cut or otherwise opened by the user just prior to or at the time of filling the bag. Such procedure assures that no foreign matter, such as dust or spores can enter the bag during shipping, handling or storage of the bags prior to their use, and if desired the interior of the bag can be kept in an actual sterile condition until used if sterile air is supplied through passage 23 for expanding the tube as it is formed.

Alternatively the valve member may be formed by forcing a portion of the wall of tube 21—22, while in a plastic condition, inwardly around a former member instead of drawing it outwardly into a suction mold box. Such procedure is diagrammatically illustrated in FIG. 9, where box 25 is replaced by an open ended box 54, the open end 55 of which is brought into contact with tube 21, as indicated in FIG. 9, and advanced in timed relation with the extrusion thereof as previously described with respect to box 25. As best shown in FIGS. 10 and 11 a former member 56 is reciprocably mounted in box 54, and reciprocated therein by a stem 57 extending outwardly through an opening 58 in the closed end of the box, which opening is provided with a suitable packing to substantially seal the opening against air leakage. A sufficient portion of the surfaces of member 56 are maintained spaced from the adjacent walls of box 54 (by grooves or therewise) as indicated at 60, so that as the member 56 is advanced against the wall of tube 21, suction, created in the chamber 61 at the rear of member 56 as the latter advances, is effective to draw the film into close contact with the former 56 to form the valve member, as indicated at 62 in dotted lines. As in the procedure previously described the polyethylene or other hot plastic seals itself, while in the hot state to the metal at the edges of the open end 55 of box 54 so that the walls of the valve member are formed from that portion of the wall of tube 21 which is within the perimeter defined by the edges of the open end of box 54. As previously described an additional thickness of material may be provided in this area if desired.

When the box 54 has been advanced to the position, diagrammatically indicated at 63 in FIG. 9, where the plastic has cooled to a substantially form-stable condition, the member has completed its advance into the side wall of the tube to complete the formation of the valve member 62 and the member 56 is thereafter progressively withdrawn into box 54 as the latter is also withdrawn from contact with the tube 22 and returned to its original position for a succeeding cycle of operation.

While member 56 has been shown as rectangular in cross section it will be understood that it may be oval in cross section or of any other appropriate cross sectional shape.

If desired the closed end of the valve member 62 may be slit open, prior to withdrawal of the member 56 by providing the member 56 with a slitting blade 65, as shown in FIG. 12. As shown in the latter figure, actuating stem 57 is replaced by a hollow stem 66 in which a stem 67 reciprocates. Stem 67 extends through a bore 68 in member 56 and carries blade 65 at its outer end. Blade 65 is sheathed in an elongated slot 69, formed in the forward face of member 56, during the valve forming movement member 56, and is thereafter projected forwardly of member 56, by any suitable means not shown, to slit the end of the valve member 62.

As is apparent the procedure just described leaves the valve member 62 inwardly of the bag and it can be left in that position during the transverse sealing of the tube and its transverse cutting into separate bags after which it can be withdrawn prior to filling and opening of its end, if the latter has not been previously slit. If the end has been slit open, as by the blade 65 of FIG. 12, it may be left in its inward position during filling under appropriate circumstances.

Both procedures above described result in a valve member formed integral with the tube wall—thus the only structural seams are those at the ends of the bag, as at 12 and 13, FIG. 1.

In some instances it may be found desirable to form the valve member apart from the material of the tube, and this may be done within the scope of the invention by substituting for the boxes 25 and 54 an open ended box 70, the open end being indicated at 71′, such as diagrammatically shown in FIGS. 13 and 14. The closed end of box 70 is provided with a plurality of perforations 71 and a piston 72, making a substantially air-tight fit with the side walls of the box is adapted for reciprocation therein by means of a stem or rod 73. A preformed valve member 74 in the form of an open ended bag of plastic material, the same as, or comparable with, that of the tube 21 to which it is to be applied, is positioned over the perforated end of box 70 as shown in dotted lines in FIGS. 13 and 14. The valve member 74 may if desired be formed on the box 70 from a web of film by conventional folding mechanism if desired.

With the valve member positioned on box 70 the latter is moved in a manner similar to that described with reference to boxes 25 and 54 against the hot plastic tube 21 as the latter emerges from the die 20. As the base of valve member 74 is brought into contact with the hot plastic material, the tube 21 plunger 72—73 is withdrawn relative to box 70 thereby creating a vacuum in chamber 75 forwardly of the piston, which vacuum is effective through openings 71 to effect a firm weld bonding of the hot material of tube 21 with the engaged portion of member 74 as the latter portion softens under the heat transfer from the hot plastic. As the box 70 and the portion of the tube engaged thereby reaches the position where the plastic of the tube has become form-stable the direction of movement of plunger 72 relative to box 70 is reversed to create pressure in chamber 75 and aid in the separation of box 70 from the inside of the member 74 which is left welded to the tube 22 on the entire bottom surface of member 74.

If desired piston 72 may be provided with a slitting blade 76 which upon advance of the plunger 73 is projected through a slot 77 to slit the bottom of the valve member 74 and the wall of tube 22 to which it is welded to open the valve to the interior of the bag. The procedure illustrated by FIGS. 13 and 14 with the subsequent bag forming steps of FIG. 5 produces a valved bag structure as illustrated in FIG. 15.

It will be understood that in the event that in the last two described procedures adequate vacuum is not produced by the movement of member 56 or piston 72 that recourse may be had to an outside vacuum supply such as is shown in FIG. 5.

It will be understood that if desired, the tube 22 instead of being expanded, by interior pressure, from a tube 21 of less diameter, as above described, may be extruded at finished diameter from a die orifice of that diameter (either in circular or partially flattened form).

This latter extruding procedure has the advantage that the transverse weld 47 may be made closely adjacent to the extruding die where the material is sufficiently hot and plastic for welding purposes. The transverse weld may thus be made without supplying extraneous heat to the welding bar and the transverse weld and the formation of the adjacent valve member may be effected substantially simultaneously.

While the valve member has been previously described as being tucked into the bag following filling with its end open, the closure of the tucked-in valve being effected by the weight of the filling material when the bag is inverted, the open end of the valve may be welded closed before being tucked in, or after being welded closed the valve may be left extending exteriorly of the bag.

It will be seen that the invention provides a continuous method of producing valved bags of polyethylene and other suitable thermoplastic materials making possible a reduction in manufacturing costs which make the use of such bags economically practical even for relatively large sized bags. Bags formed in accordance with the invention and of a film thickness of 6 to 10 mils are of adequate strength for capacities up to 50 lbs. or more. Such bags find a wide utility in the bagging, handling and storage of grains, chemicals, fertilizers, and finely powdered materials.

What is claimed is:

1. The method of making merchandizing bags of thermoplastic material which comprises, heating the material to a plastic condition, extruding the heated material through a die orifice to continuously form a seamless tube, providing the tube as it emerges from the die orifice and while it is in a plastic deformable condition with a succession of spaced filling valve members extending integrally therefrom and at an angle to the axis thereof, welding successive opposed transverse portions of the seamless tube walls, adjacent to and at one side of said filing valve members, together to form a succession of connected lengths of closed seamless tubing with each of said lengths provided with a filling tube, and severing the valve member transversely substantially centrally along said transversely welded portions.

2. The method recited in claim 1 in which the filling valve members are formed by molding a portion of the hot plastic of the tube wall into a tubular form opening from the interior of said seamless tube and closed at its outer end.

3. The method recited in claim 2 the further step of opening the ends of the filling valve members prior to the transverse severing of the tube.

4. The method of making merchandizing bags formed of thermoplastic material which comprises, heating the material to a plastic condition, extruding it through a die orifice to constantly form a seamless tube, successively engaging the wall of the tube as it emerges from the die orifice and while it is in a plastic deformable condition, with a member having a tubular molding surface, drawing the engaged wall portion over said molding surface to form a succession of filling valves extending at substantially right angles to the axis of the tube issuing from the die, welding successive opposed transverse portions of the seamless tube walls, adjacent to and at one side of said filling valves, together to form a succession of connected lengths of closed seamless tubing with each of said lengths provided with a filling valve, and severing the tube transversely substantially centrally along said transversely welded portions.

5. The method of making merchandizing bags formed of thermoplastic material which comprises, heating the material to a plastic condition, extruding it through a die orifice to constantly form a seamless tube, successively engaging the wall of the tube as it emerges from the die orifice and while it is in a plastic deformable condition with an open ended suction box, applying suction to the box to draw the portion of the tube wall surrounded by the box outwardly into the box cavity to form a succession of filling valves, opening from the interior of said seamless tube and closed at its outer end, welding successive opposed transverse portions of the seamless tube walls, adjacent to and at one side of said filling valves, together to form a succession of connected lengths of closed seamless tubing with each of said lengths provided with a filling valve, and severing the tube transversely substantially centrally along said transversely welded portions.

6. In the method recited in claim 5 the further step of slitting open the closed end of the filling valve as the tube wall is drawn against the closed end portion of the suction box.

7. The method of making merchandizing bags formed of thermoplastic material which comprises, heating the material to a plastic condition, extruding it through a die orifice to constantly form a seamless tube, successively engaging the wall of the tube, as it emerges from the die orifice and while it is in a plastic deformable condition, by a forming member, successively advancing said member in a direction inwardly of the tube while drawing the engaged portion of the tube wall against said member to form a succession of filling valves, opening from the exterior of said seamless tube and closed at its inner end, welding successive opposed transverse portions of the seamless tube walls, adjacent to and at one side of said filling valve, together to form a succession of connected lengths of closed seamless tubing with each of said lengths provided with a filling valve, and severing the tube transversely substantially centrally along said transversely welded portions.

8. In the method recited in claim 7 the further step of slitting open the closed end of the filling valve prior to withdrawing the forming member therefrom.

9. The method of making merchandizing bags of thermoplastic material which comprises, heating the material to plastic condition, extruding the heated material through a die orifice to continuously form a seamless tube, pressing in succession the closed end of preformed filling valve members, open at their other end, against the tube as it emerges from the die orifice and while it is in a plastic condition to weld the closed end of the filling valve members to the wall of the tube, welding successive opposed transverse portions of the seamless tube walls, adjacent to and at one side of said filling valve members, together to form a succession of connected lengths of closed seamless tubing with each said length provided with a filling valve member, and severing the tube transversely substantially centrally along said transversely welded portions.

10. In the method recited in claim 9 the further step of slitting open the closed end of the filling valve member and that portion of the tube wall to which it is welded.

11. In the method recited in claim 9 the further step of applying suction to the closed end of the preformed filling valve member as the latter is welded to the wall of the tube.

12. The method of making valved bags from thermoplastic materials which comprises continuously extruding the material in a heated and plastic condition through an annular die orifice to form a tube, introducing at least sufficient air pressure to the interior of the tube to prevent collapse of the tube, providing the wall of the continuously extruding tube while still in a plastic state with spaced transversely extending tubular filling valve members, heat sealing the opposing walls of the continuously extruding tube together at transversely extending zones closely adjacent the tubular valve members, and thereafter severing the tube transversely along a line within the said zones to form individual valved bags.

References Cited in the file of this patent
UNITED STATES PATENTS

| | | |
|---|---|---|
| 2,245,675 | Hultin | June 17, 1941 |
| 2,265,075 | Knuetter | Dec. 2, 1941 |
| 2,446,308 | Smith | Aug. 3, 1948 |
| 2,452,080 | Stephenson | Oct. 26, 1948 |
| 2,584,632 | Southwick | Feb. 5, 1952 |
| 2,696,342 | Toborg | Dec. 7, 1954 |
| 2,749,572 | Nowak | June 12, 1956 |
| 2,775,082 | Vogt | Dec. 25, 1956 |
| 2,800,269 | Smith | July 23, 1957 |
| 2,804,257 | Hasler | Aug. 27, 1957 |
| 2,923,978 | Corzine | Feb. 9, 1960 |
| 2,924,852 | Michalko | Feb. 16, 1960 |